United States Patent
Kim et al.

(10) Patent No.: US 10,300,813 B2
(45) Date of Patent: May 28, 2019

(54) HEIGHT ADJUSTMENT APPARATUS FOR VEHICLE SEAT

(71) Applicants: Hyundai Motor Company, Seoul (KR); Kia Motors Corporation, Seoul (KR); HYUNDAI DYMOS INC., Seosan-si (KR); Faurecia Automotive Seating Korea Limited, Suwon-si (KR)

(72) Inventors: Gil Ju Kim, Seoul (KR); Chan Ho Jung, Gunpo-si (KR); Sang Do Park, Suwon-si (KR); Keun Gwack, Ulsan (KR); Jong Moon Yoo, Hwaseong-si (KR); Sang Ho Kim, Incheon (KR); Jun Yeol Heo, Suwon-si (KR); Seon Chae Na, Yongin-si (KR); Byung Yong Choi, Hwaseong-si (KR); Sang Man Seo, Suwon-si (KR); Eom Seok Yoo, Hwaseong-si (KR); Jae Yong Jang, Suwon-si (KR); Erwan Guillouet, Stadthagen (DE)

(73) Assignees: Hyundai Motor Company, Seoul (KR); Kia Motors Corporation, Seoul (KR); HYUNDAI DYMOS INC., Seosan-si (KR); Faurecia Automotive Seating Korea Limited, Suwon-si (KR)

( * ) Notice: Subject to any disclaimer, the term of this patent is extended or adjusted under 35 U.S.C. 154(b) by 32 days.

(21) Appl. No.: 15/399,627

(22) Filed: Jan. 5, 2017

(65) Prior Publication Data

US 2018/0009338 A1    Jan. 11, 2018

(30) Foreign Application Priority Data

Jul. 6, 2016    (KR) .......................... 10-2016-0085278

(51) Int. Cl.
B60N 2/16    (2006.01)

(52) U.S. Cl.
CPC ........... B60N 2/165 (2013.01); B60N 2/1615 (2013.01); B60N 2/1635 (2013.01)

(58) Field of Classification Search
CPC ...... B60N 2/16; B60N 2/1615; B60N 2/1635; B60N 2/165; B60N 2/1814; B60N 2/1864; B60N 2/1875

(Continued)

(56) References Cited

U.S. PATENT DOCUMENTS

| 4,720,070 | A | * | 1/1988 | Nishino | ............... | B60N 2/1864 |
| | | | | | | 248/394 |
| 4,738,427 | A | * | 4/1988 | Nishino | ............... | B60N 2/1864 |
| | | | | | | 248/421 |

(Continued)

FOREIGN PATENT DOCUMENTS

JP    2013-107486 A    6/2013
KR    10-2009-0015452 A    2/2009

(Continued)

*Primary Examiner* — Muhammad Ijaz
*Assistant Examiner* — Guang H Guan
(74) *Attorney, Agent, or Firm* — Morgan, Lewis & Bockius LLP

(57) ABSTRACT

A height adjustment apparatus for a vehicle seat may include a pinion gear mounted in a side frame having a front portion and a rear portion are connected to a seat bracket by links; a rack gear engaged with a top end of the pinion gear and coupled with the seat bracket via an hinge, the rack gear moving according to driving of the pinion gear to raise and lower the side frame; and a play adjustment bracket for guiding up and down motion of the moving rack gear by providing repulsive force to a top portion of the rack gear, the play adjustment bracket being fixedly positioned by being fastened with a plurality of support pins provided in the pinion gear and the side frame.

6 Claims, 3 Drawing Sheets

(58) Field of Classification Search
USPC .......... 248/292.12, 419, 420, 421, 422, 423, 248/157; 297/344.12, 344.13, 344.14, 297/344.15, 338; 296/146.4, 146.8
See application file for complete search history.

(56) References Cited

U.S. PATENT DOCUMENTS

| | | | | |
|---|---|---|---|---|
| 6,382,706 B2 * | 5/2002 | Yuge | ........................ | B60J 5/106 296/106 |
| 6,398,308 B1 * | 6/2002 | Becker | .................. | B60N 2/165 297/216.13 |
| 6,425,557 B1 * | 7/2002 | Becker | .................... | B60N 2/06 248/157 |
| 6,502,799 B2 * | 1/2003 | Lepaule | ................ | B60N 2/1615 248/396 |
| 6,513,859 B2 * | 2/2003 | Yuge | .................... | E05F 15/619 296/146.4 |
| 6,659,548 B2 * | 12/2003 | Becker | ................ | B60N 2/0276 297/216.1 |
| 7,243,976 B2 * | 7/2007 | Okada | .................. | E05F 15/619 296/146.4 |
| 7,278,686 B2 * | 10/2007 | Yoshida | ............... | B60N 2/1615 248/421 |
| 7,316,454 B2 * | 1/2008 | Yoshida | ............... | B60N 2/1615 297/344.14 |
| 7,413,252 B2 * | 8/2008 | Kim | ....................... | B60N 2/165 297/344.15 |
| 7,604,213 B2 * | 10/2009 | Choi | .................... | B60N 2/0232 248/419 |
| 7,766,427 B2 * | 8/2010 | Kojima | .................... | B60N 2/06 248/423 |
| 7,774,983 B2 * | 8/2010 | Shimura | ............... | E05F 15/619 296/146.4 |
| 9,108,538 B2 * | 8/2015 | Becker | .................. | B60N 2/045 |
| 9,254,762 B2 * | 2/2016 | Suzuki | ................ | B60N 2/1615 |
| 2009/0152433 A1 | 6/2009 | Choi et al. | | |
| 2018/0009338 A1 * | 1/2018 | Kim | .................... | B60N 2/1635 |

FOREIGN PATENT DOCUMENTS

| | | |
|---|---|---|
| KR | 10-2009-0063583 A | 6/2009 |
| KR | 10-2012-0116747 A | 10/2012 |
| KR | 10-1526421 B1 | 6/2015 |

* cited by examiner

HEIGHT ADJUSTMENT APPARATUS FOR VEHICLE SEAT

CROSS-REFERENCE(S) TO RELATED APPLICATION

The present application claims priority to Korean Patent Application No. 10-2016-0085278 filed on Jul. 6, 2016, the entire contents of which is incorporated herein for all purposes by this reference.

BACKGROUND

Field of the Invention

The present invention relates to a height adjustment apparatus for a vehicle seat, and more particularly to a height adjustment apparatus for a vehicle seat, which is configured for enhancing vibration performance by maintaining constant operating force and at the same time reducing generation of play when adjusting height of the seat.

Description of Related Art

Typically, a vehicle seat has a cushion section and a backrest section for supporting the hip and the back of an occupant respectively.

Such a typical vehicle seat is equipped with a manual adjustment apparatus for adjusting an angle of the backrest section. However, there has been a trend to apply a vehicle an electric seat that allows height of the cushion section as well as the angle of the backrest section to be adjusted by means of a motor and a gear assembly.

Specifically, the vehicle seat is mounted to a seat bracket installed in the interior of the vehicle by coupling cushion side frames provided on opposite side ends of the cushion section to the seat bracket by means of links and it is provided with a gear assembly installed on a lower portion of the cushion section in order to adjust height of the cushion section so that the cushion section can be raised and lowered by rotation of the motor.

In other words, by configuring a height adjustment apparatus for a vehicle seat in such a manner that a pinion gear is installed on the cushion side frame and a rack gear is installed on the link portions so that the pinion gear moves by driving of the motor, the height adjustment apparatus is capable of raising and lowering the cushion section by interlocking with the rack gear.

However, such height adjustment apparatus for a vehicle seat has a problem that since the pinion gear for guiding movement of the rack gear and closing bracket rollers are fixedly installed and the rack gear moves between the pinion gear and the closing bracket rollers, which are fixed with each other, interference and clearance of the rack gear can occur when the cushion section is raised and lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a height adjustment apparatus for the vehicle seat that is configured for enhancing vibration performance by reducing interference and play of a rack gear generated by height adjustment of the seat by being configured such that when the rack gear receives load from a pinion gear during its movement and hence may have up and down motion, first and second rack gear guides exert repulsive force and thus guide the up and down motion of the rack gear.

In one aspect, the present invention provides a height adjustment apparatus for the vehicle seat including: a pinion gear mounted on a side frame having a front portion and a rear portion that are connected to a seat bracket by links; a rack gear engaged with a top end of the pinion gear and coupled with the seat bracket via an hinge, the rack gear moving according to driving of the pinion gear such that the rack gear raises and lowers the side frame; and a play adjustment bracket for guiding up and down motion of the moving rack gear by providing repulsive force to a top portion of the rack gear, the play adjustment bracket being fixedly positioned by being fastened to a plurality of supporting pins provided on the pinion gear and the side frame.

In an exemplary embodiment, the play adjustment bracket includes a first rack gear guide for adjusting play of the rack gear being moved, which is formed to project toward a top portion of the rack gear and moves in contact with the top portion of the rack gear; and a second rack gear guide for guiding movement of the rack gear, which is formed to surround an upper outer circumference surface of the rack gear.

In another exemplary embodiment, the first rack gear guide is formed in a way that shape of a contact area in surface contact with a top portion of the rack gear is rounded.

In still another exemplary embodiment, the play adjustment bracket includes a body portion having the first rack gear guide and the second rack gear guide and a connection portion fastened to the upper support pin located at a top side of the rack gear, wherein the connection portion forms a notch region and is bent at the body portion and extends to the upper support pin.

In yet another exemplary embodiment, the notch region is formed such that it may have a length and a first end thereof is formed in a rounded shape having a diameter of approximately 1 mm or more.

In still yet another exemplary embodiment, the notch region is formed to have an internal width interval of approximately 2 mm or more.

In a further exemplary embodiment, the upper support pin is arranged to be spaced apart from a central axis of the pinion gear.

In another further exemplary embodiment, the rack gear includes a stopper arranged to be engaged with the pinion gear to block rotation of the pinion gear.

The present invention may have an effect that when the rack gear receives load from the pinion gear and thereby may have a motion in up and down directions during its movement, the first rack gear guide and the second rack gear guide exert repulsive force and hence guide the up and down motion of the rack gear so that interference and play of the rack gear resulting from height adjustment of the seat can be reduced, thereby enhancing vibration performance.

Furthermore, the present invention may have an effect that when the first and second rack gear guides are loaded significantly resulting from change of the angle during movement of the rack gear, they are allowed to always have a constant repulsive force through change of form thereof by the notch structure, thereby maintaining constant operating force.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
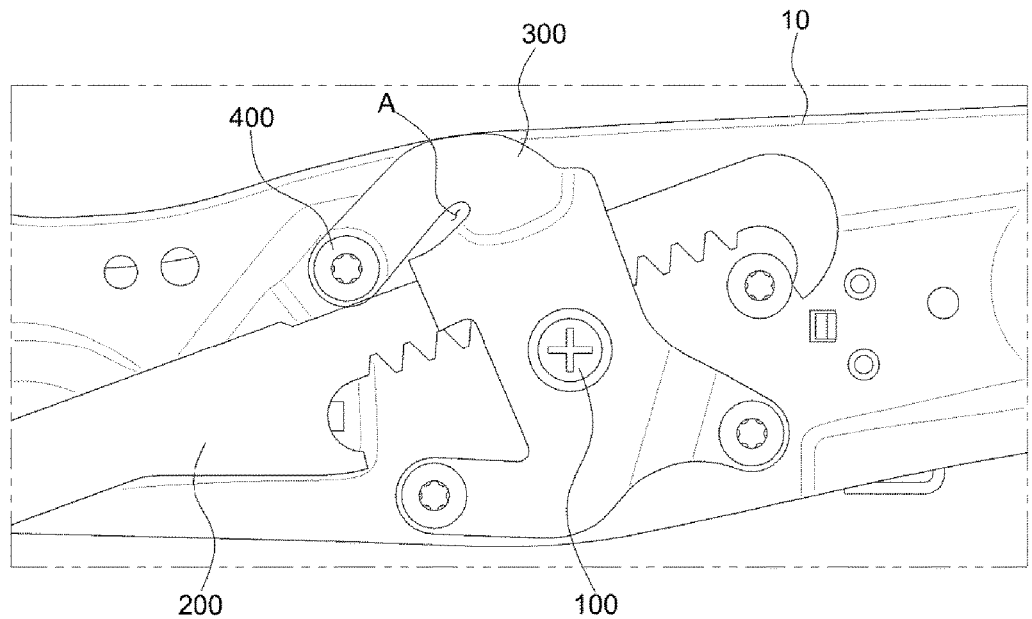
FIG. 1 is a view illustrating a height adjustment apparatus for a vehicle seat according to an embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will now be described in detail with reference to the accompanying drawings.

Advantages and features of the present invention and methods for achieving them will be clearly understood from exemplary embodiments described in detail below with reference to the accompanying drawings.

However, the present invention is not limited to the exemplary embodiments described below, but can be implemented in various ways. The exemplary embodiments are provided to complete the disclosure of the present invention and to completely notify the scope of the present invention to those skilled in the art. Therefore, the present invention is defined only by the scope of the claims.

In addition, in the following description, detailed explanation of known related arts and the like may be omitted to avoid unnecessarily obscuring the subject matter of the present invention.

Figure 2:
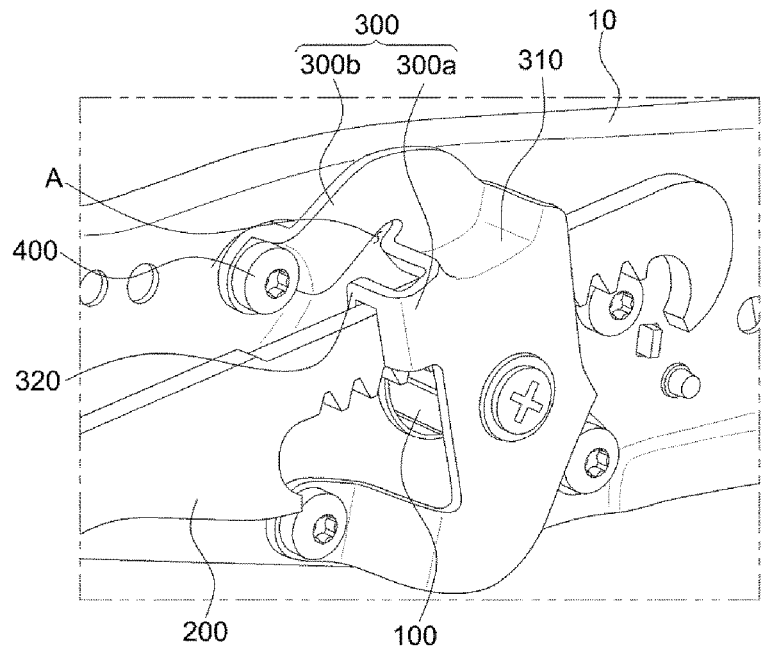
FIG. 2 is a perspective view illustrating schematically operation of the height adjustment apparatus for the vehicle seat according to the embodiment of the present invention.

FIG. 1 is a view illustrating a height adjustment apparatus for a vehicle seat according to an embodiment of the present invention. FIG. 2 is a perspective view illustrating schematically operation of the height adjustment apparatus for the vehicle seat according to the embodiment of the present invention.

Figure 3:
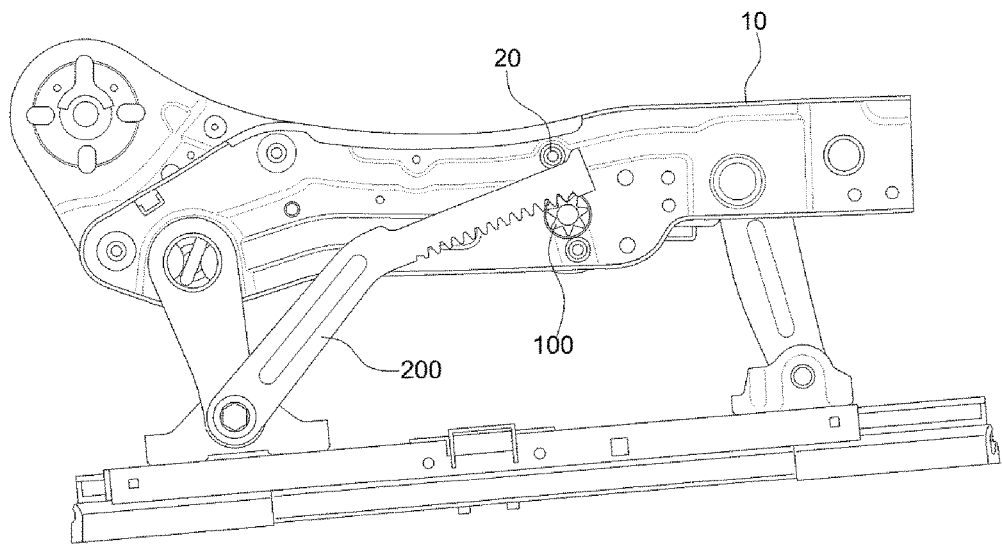
FIG. 3 is a view illustrating ascending and descending movements of a height adjustment apparatus for the vehicle seat in the prior art.
Figure 4:
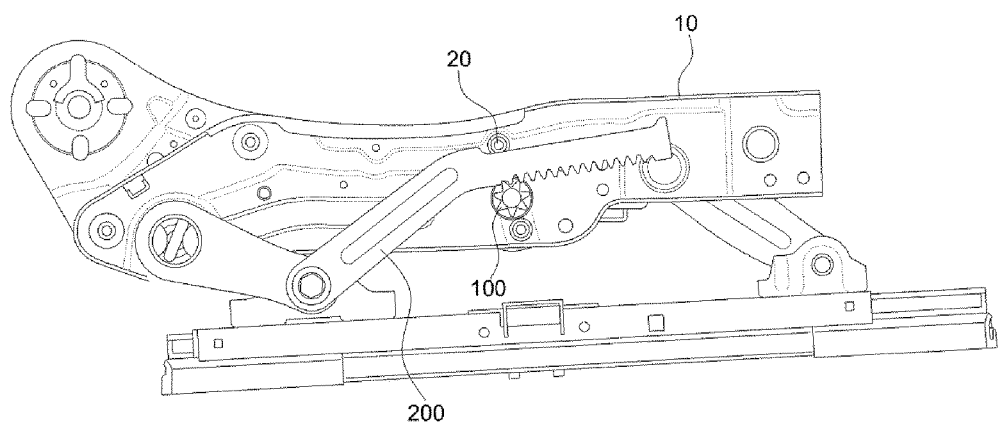
FIG. 4 is a view illustrating ascending and descending movements of the height adjustment apparatus for the vehicle seat in the prior art.

FIG. 3 is a view illustrating ascending and descending movements of a height adjustment apparatus for the vehicle seat in the prior art. FIG. 4 is a view illustrating ascending and descending movements of the height adjustment apparatus for the vehicle seat in the prior art.

As shown in FIG. 1 and FIG. 2, a height adjustment apparatus of for the vehicle seat includes a pinion gear 100, a rack gear 200 and a play adjustment bracket 300.

First, the pinion gear 100 is mounted on a side frame 10 having a front portion and a rear portion that are coupled to a seat bracket by a pair of links.

That is, the pinion gear 100 is mounted on the side frame 10 provided on opposite side ends of the vehicle seat cushion wherein this side frame 10 is coupled to the front and rear portions of the seat bracket by the respective links and each of the links is a structure that each link is connected by a hinge structure and ascends while moving forward and descends while moving backward.

This pinion gear 100 is rotated by a motor and hence moves the rack gear 200 engaged therewith forward or backward, thereby raising and lowering the whole of the side frame 10 coupled to the vehicle seat cushion.

The rack gear 200 is engaged with a top end of the pinion gear 100 and coupled via an hinge with the seat bracket, i.e., a link connection portion between the seat bracket and the side frame 10 so that it moves according to driving of the pinion gear 100 and thereby raises and lowers the side frame 10.

On the other hand, in the prior art, a rack gear 200 is coupled and moves between a pinion gear 100 of which the position is fixed and a bracket roller 20, as shown in FIG. 3. At this time, an angle of the rack gear 200 varies depending on height adjustment of the side frame 10.

In this case, a top surface of the rack gear 200 excessively closely contact the bracket roller 20 due to such variation in the angle, with the result that interference between the rack gear 200 and the bracket roller 20 and operating force are generated excessively.

Furthermore, as the side frame 10 descends, angle of the rack gear 200 becomes smaller than that in FIG. 3, as shown in FIG. 4, which causes play between the rack gear 200 and the bracket roller 20. Consequently, according to such a structure, the rack gear 200 moving between the bracket roller 20 and the pinion gear 100 cannot be pushed constantly and hence operating force of the rack gear 200 can be lowered.

In connection with this, the present exemplary embodiment of the present invention can solve the problem as described above by configuring the height adjustment apparatus to have a play adjustment bracket 300.

This play adjustment bracket 300 is fastened by a plurality of support pins 400 provided in the pinion gear 100 and on the side frame 10 and hence the position thereof is fixed.

Furthermore, the play adjustment bracket 300 can provide repulsive force to a top portion of the rack gear 200 so that it can guide up and down motion of the moving rack gear 200.

In this case, the play adjustment bracket 300 includes a first rack gear guide 310 and a second rack gear guide 320.

First, the first rack gear guide 310 is formed to project toward a top portion of the rack gear 200 of which a bottom portion is engaged with the pinion gear 100 and has a predetermined shape and is mounted to contact the top portion of the rack gear 200, thereby controlling the play between the moving rack gear 200 and the first rack gear guide 310.

Accordingly, by virtue of the feature of the shape of the first rack gear guide 310, the first rack gear guide is configured for providing repulsive force to the rack gear 200 and at a same time preventing the occurrence of excessive interference to the rack gear 200 when the angle of the rack gear 200 becomes larger as the side frame 10 ascends.

Furthermore, since the first rack gear guide 310 is formed to project toward the top portion of the rack gear 200, it is configured for reducing occurrence of the play with the top portion of the rack gear 200 when the angle of the rack gear 200 becomes smaller as the side frame 10 descends and as a result, it is configured for solving the problem in the prior art that operating force of the rack gear 200 is lowered.

Next, the second rack gear guide 320 is formed to surround an upper outer circumference surface of the rack gear 200, and guides movement of the rack gear 200.

The second rack gear guide 320 is positioned to be spaced apart from the first rack gear guide 310, and provides repulsive force to the top portion of the moving rack gear 200 in a same manner as the first rack gear guide 310 and hence guides up and down motion of the rack gear 200.

In addition, unlike the conventional arrangement in which axes of the bracket roller 20 and the pinion gear 100 are aligned on a same straight line (in a vertical direction) as described earlier, an axis of a fastening location of a connection portion 300b which serves as the bracket roller 20 of the prior art, i.e., an axis of an upper support pin 400 for fastening the connection portion 300b is diagonal to the axis of the pinion gear 100 (in an oblique direction) such that a notch region A is formed, with the result that up and down motion of the rack gear 200 can be effectively guided by virtue of change of the configuration of the notch region A.

Therefore, with the structural features as described above in this embodiment, it is possible to apply constant repulsive force to the rack gear 200 all the time, with the result that it is possible to reduce the occurrence of interference and play of the rack gear 200, which may be caused by height adjustment of the seat, and hence enhance vibration performance.

Figure 5:
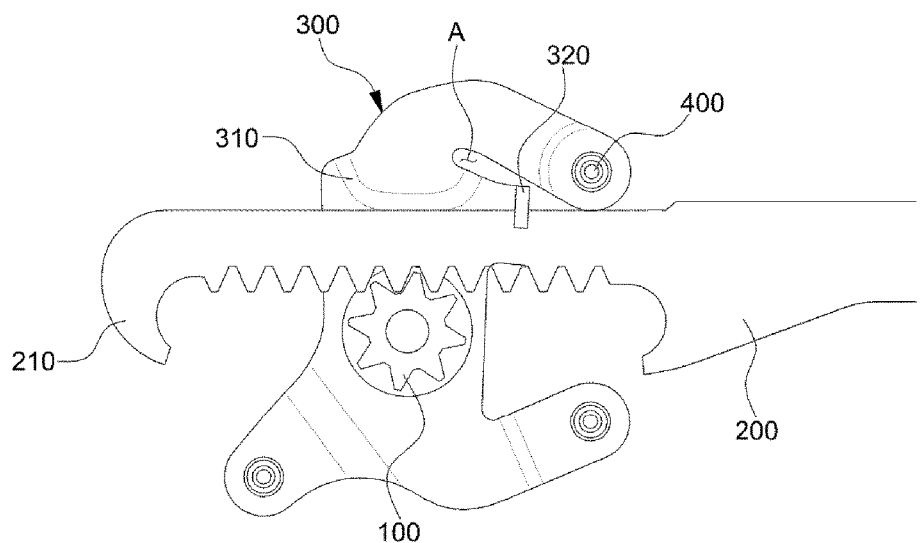
FIG. 5 is a view illustrating a play adjustment bracket of the height adjustment apparatus for the vehicle seat according to the embodiment of the present invention.

FIG. 5 illustrates the play adjustment bracket of the height adjustment apparatus for the vehicle seat according to the embodiment of the present invention.

As shown in FIG. 5, the first rack gear guide 310 is formed in such a manner that the contact region which is in surface contact with the top portion of the rack gear 200 has a rounded shape.

Accordingly, when an angle of the rack gear 200 increases as the rack gear 200 moves, one rounded surface of the first rack gear guide 310 contacts the rack gear 200, and thus the rack gear 200 is moved. Hence, it is possible to prevent the occurrence of excessive interference to the rack gear 200.

Furthermore, since the first rack gear guide 310 has an intermediate region having a flat shape, generation of a clearance between the top portion of the rack gear 200 and the first rack gear guide 310 can be reduced significantly, for example, from 0.6 mm which was generated in the prior art to 0.02 mm when the angle of the rack gear 200 becomes smaller as the rack gear 200 moves. As a result, by virtue of the structural features, the first rack gear guide 310 can push the rack gear 200 constantly, thereby enhancing operating force of the rack gear 200.

Meanwhile, the play adjustment bracket 300 includes a body portion 300a having the first rack gear guide 310 and the second rack gear guide 320, and the connection portion 300b fastened to the upper support pin 400 located at an upper side of the rack gear 200.

This connection portion 300b is bent from the body portion 300a to form the notch region A and extends to the upper support pin 400.

In this case, the notch region A functions as a spring and is formed to guide up and down motion of the rack gear 200 being moved by change =in its shape. A first end of the notch region A is rounded and, the first end may have a diameter of approximately 1 mm or more to be changed effectively by absorbing load caused by up and down motion of the rack gear 200.

In addition, the notch region A is formed to have a width spacing of approximately 2 mm or more to be changed according to the up and down motion of the rack gear 200 to absorb load.

Figure 6:
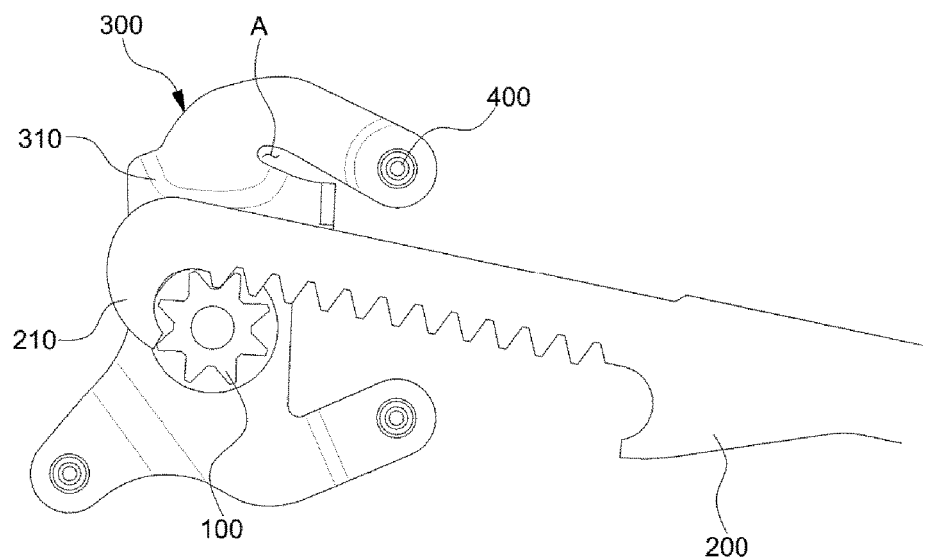
FIG. 6 is a view illustrating a stopper of the height adjustment apparatus for the vehicle seat according to the embodiment of the present invention.

FIG. 6 illustrates a stopper of the height adjustment apparatus for the vehicle seat according to the embodiment of the present invention.

As shown in FIG. 6, the rack gear 200 includes a stopper 210 that is caught by the pinion gear 100 to block the rotation of the pinion gear 100.

In this case, the stopper 210 is formed in a hook shape such that it is caught by the pinion gear 100. Since the stopper is caught by the pinion gear 100, the stopper blocks the rotation of the pinion gear so that problems including noise and play occurring at the end portion of the rack gear 100 may be solved.

That is, the stopper 210 can be positioned to be caught to a gear tooth of the pinion gear 100 such that the pinion gear 100 can no longer rotate when the angle of the rack gear 200 increases as the side frame 10 ascends or descends, and thus the pinion gear 100 does not rotate in a state in which the side frame 10 moves upwards to a predetermined maximum height at which the side frame 10 no longer ascends.

In the prior art, however, since there is no such a stopper 210, the pinion gear 100 can be rotated continuously by driving of the motor even at a predetermined maximum height, which can cause quality problems.

Consequently, according to this embodiment, it is possible to block rotation of the pinion gear 100 by the stopper 210 mounted to a first end of the rack gear 200 so that it is possible to prevent damage to joints and gear teeth of the pinion gear 100 and also quality problems including vibration.

The present invention has an effect that when the rack gear receives load from the pinion gear and thereby has a motion in a vertical direction during its movement, the first rack gear guide and the second rack gear guide exert repulsive force and hence guide upward and downward movement of the rack gear so that interference and play of the rack gear resulting from height adjustment of the seat can be reduced, thereby enhancing vibration performance.

Furthermore, the present invention has an effect that when the first and second rack gear guides are loaded significantly resulting from change of the angle during movement of the rack gear, they are allowed to have a constant repulsive force through change in a form thereof by the notch structure, thereby maintaining constant operating force.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A height adjustment apparatus for a vehicle seat, the height adjustment apparatus comprising:
   a seat bracket having a front portion and a rear portion;
   a side frame connected to the front portion of the seat bracket and the rear portion of the seat bracket by links;
   a pinion gear mounted on the side frame;
   a rack gear engaged with a top end of the pinion gear and coupled with the seat bracket via a hinge, the rack gear configured to move according to driving of the pinion gear to raise and lower the side frame; and
   a play adjustment bracket for guiding up and down motion of the rack gear by providing repulsive force to a top portion of the rack gear, the play adjustment bracket being fixedly positioned on the side frame and the pinion gear, the play adjustment bracket being fastened to the side frame and the pinion gear with a plurality of support pins, the plurality of support pins including an upper support pin, and the plurality of support pins being provided on the pinion gear and the side frame,
   wherein the play adjustment bracket includes:
      a body portion, the body portion having:
         a first rack gear guide for adjusting play of the rack gear, wherein the first rack gear guide projects toward the top portion of the rack gear and comes in contact with the top portion of the rack gear; and
         a second rack gear guide for guiding movement of the rack gear, wherein the second rack gear guide surrounds an upper peripheral face of the rack gear; and
      a connection portion, the connection portion being fastened to the side frame with the upper support pin, the connection portion forming a notch region, and the connection portion being bent at the body portion and extending to the upper support pin.

2. The height adjustment apparatus of claim 1, wherein the first rack gear guide includes a contact area in surface contact with the top portion of the rack gear, and the contact area of the first rack gear guide has a rounded shape.

3. The height adjustment apparatus of claim 1, wherein the notch region has a length and a first end, and the first end of the notch region is formed in a rounded shape having a diameter of approximately 1 mm or more.

4. The height adjustment apparatus of claim 1, wherein the notch region has an internal width spacing of approximately 2 mm or more.

5. The height adjustment apparatus of claim 1, wherein the upper support pin is arranged to be spaced apart from a central axis of the pinion gear.

6. The height adjustment apparatus of claim 1, wherein the rack gear includes a stopper that is configured to be caught by the pinion gear to block rotation of the pinion gear.

* * * * *